Dec. 15, 1964            G. F. WILKINSON, JR            3,161,825
        APPARATUS FOR TESTING WAVE TRANSMISSION LINES INCLUDING
Filed Jan. 27, 1960    HELICAL TRANSMISSION LINE AND WAVE DISTORTING MEANS
                                                        4 Sheets–Sheet 3
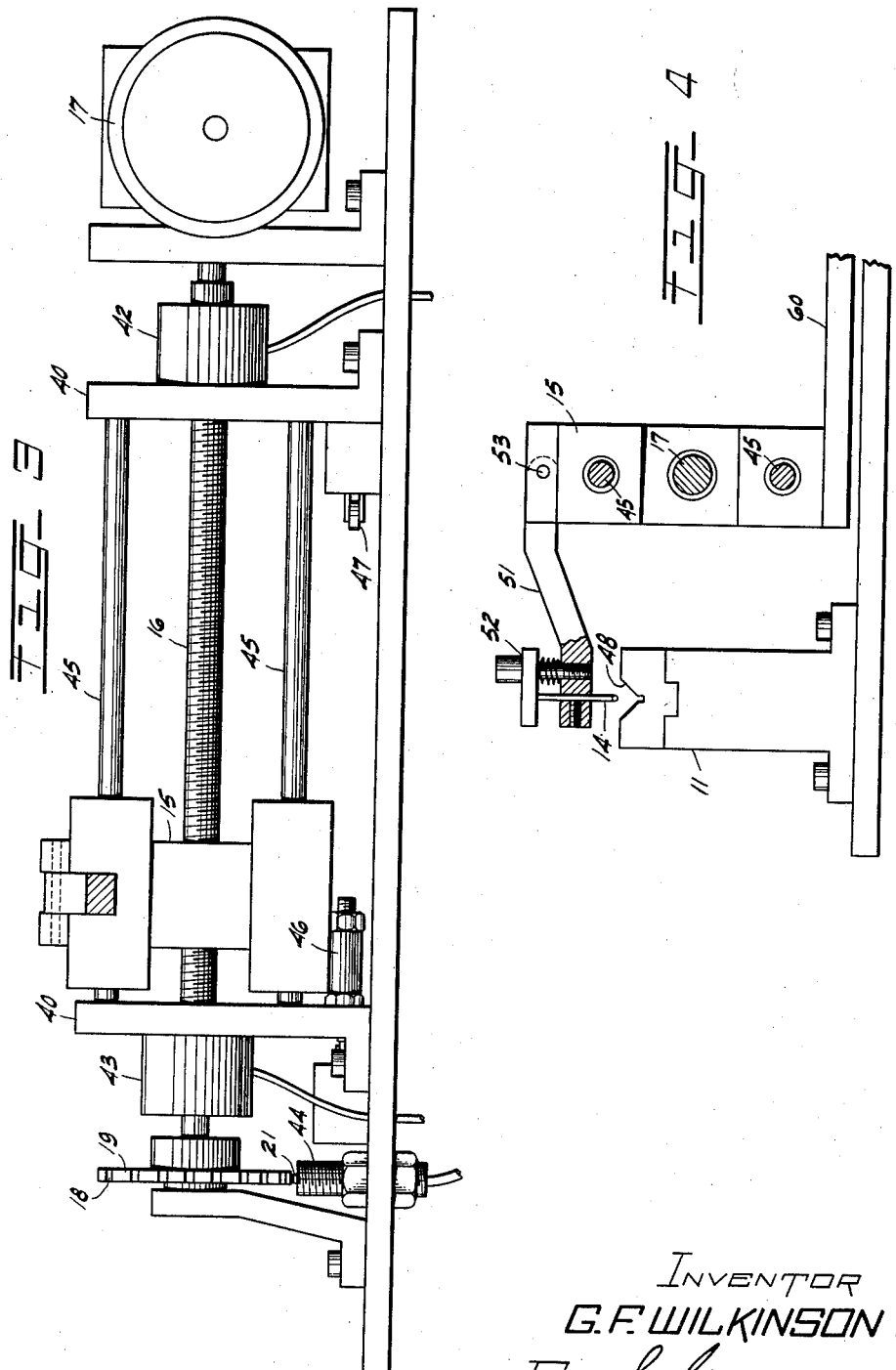
INVENTOR
G.F. WILKINSON JR
By S. Gundersen
ATTORNEY

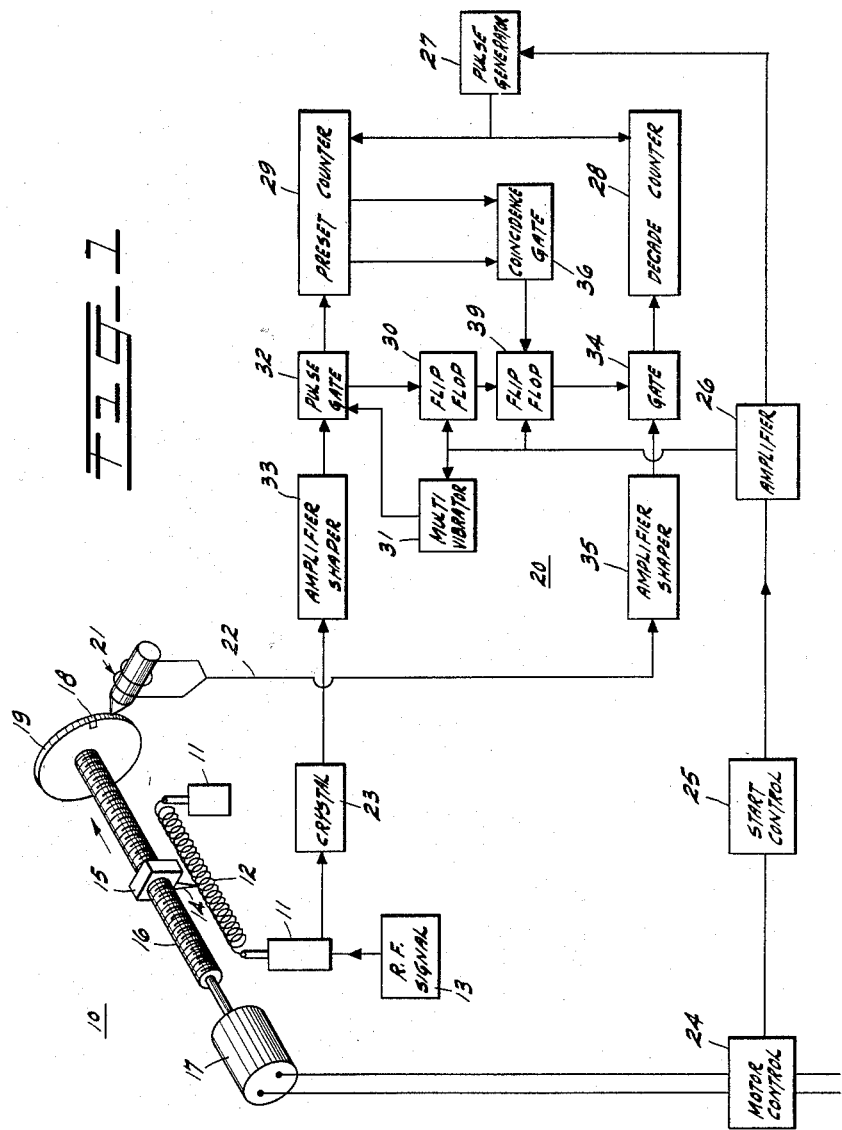

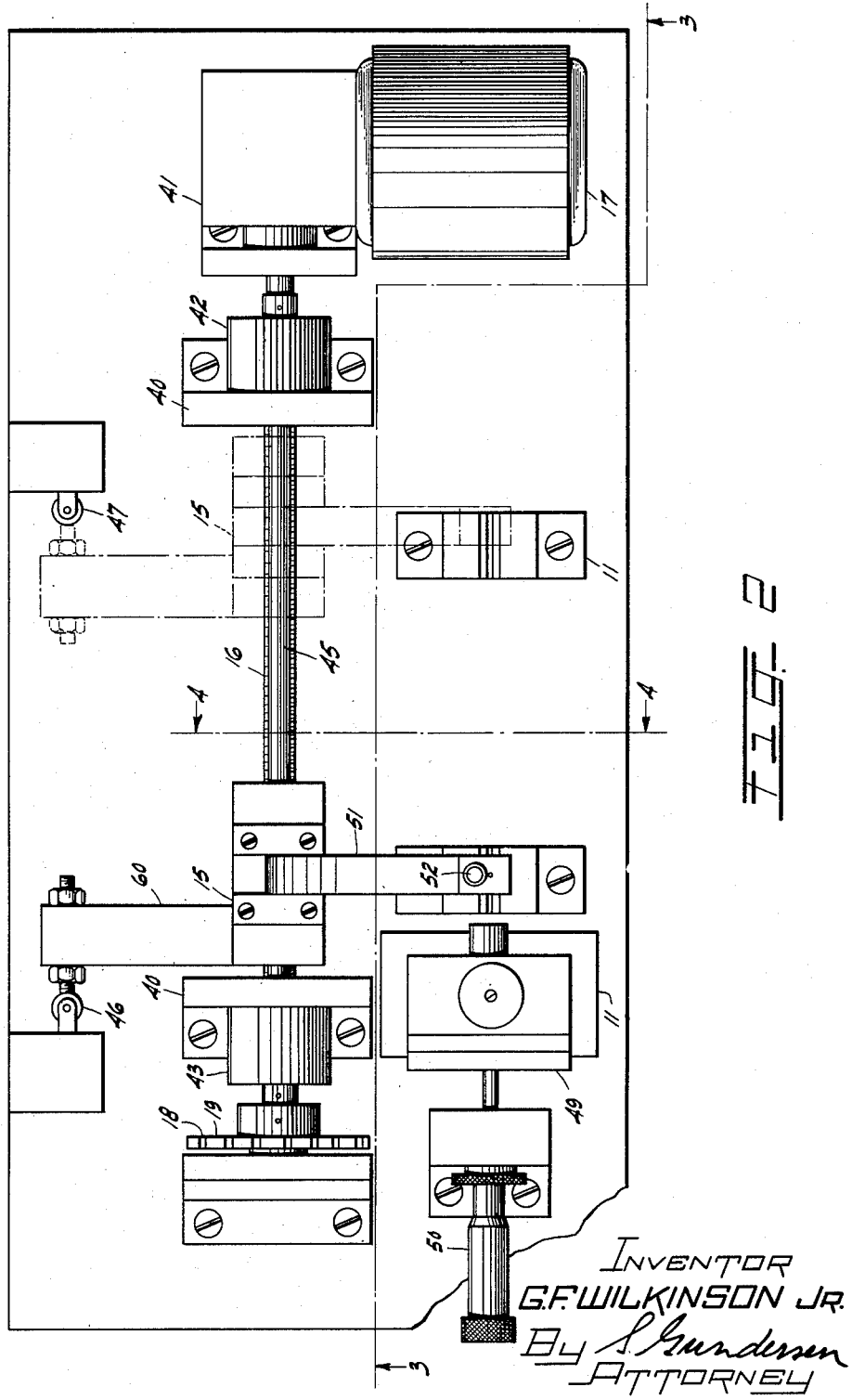

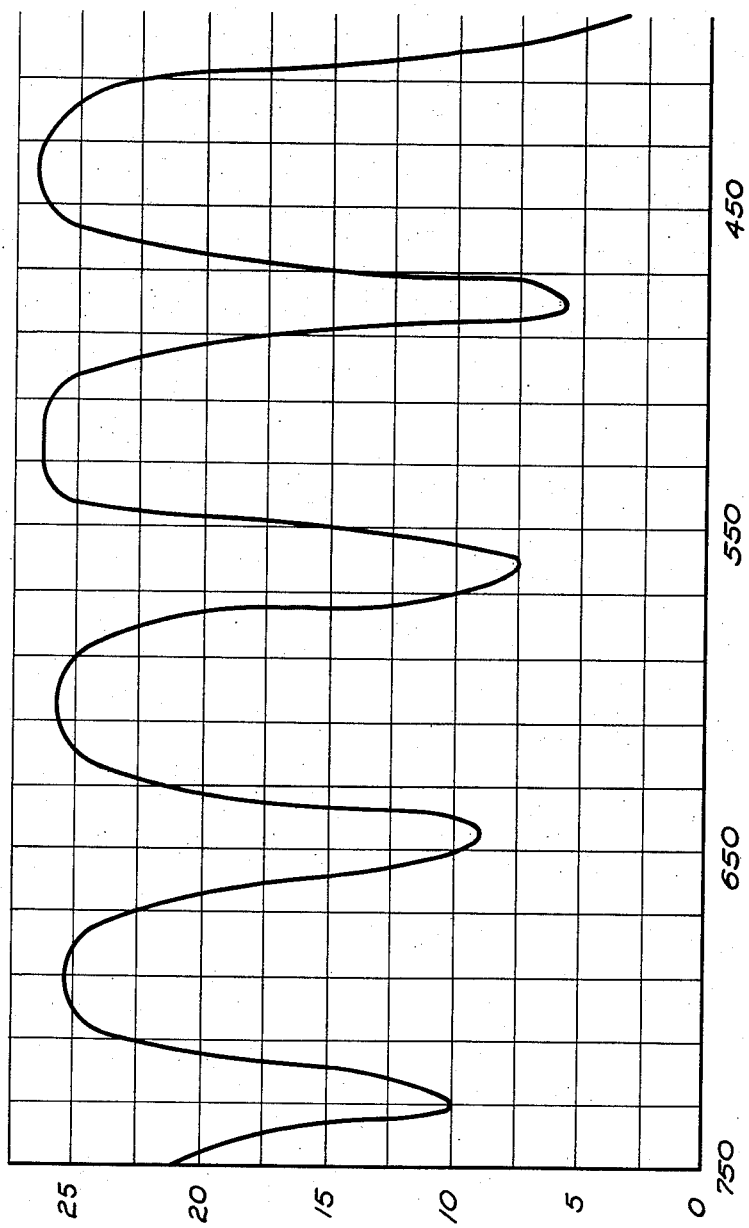

United States Patent Office 3,161,825
Patented Dec. 15, 1964

3,161,825
APPARATUS FOR TESTING WAVE TRANSMISSION LINES INCLUDING HELICAL TRANSMISSION LINE AND WAVE DISTORTING MEANS
George F. Wilkinson, Jr., Bethlehem, Pa., assignor to Western Electric Company, Incorporated, New York, N.Y., a corporation of New York
Filed Jan. 27, 1960, Ser. No. 5,047
4 Claims. (Cl. 324—58)

This invention relates to apparatus for testing transmission lines and particularly to apparatus for determining the axial wave length characteristics of helices to be used in traveling wave tubes.

It is a common practice to amplify certain high radio frequency signals by interacting the electro-magnetic wave of the signal with an electron beam in a traveling wave tube. In this technique, electrons are accelerated inside a helix between two electrodes and energy is transferred from the electrons to the wave being transmitted on the helix. Of fundamental importance in this energy exchange are the relative propagation velocities to which the wave and the electron beam travel through the tube. With respect to the wave, the geometrical parameters are determinative of the axial velocity of propagation, for a given frequency of the wave, along the helix. Furthermore, as will be shown, the axial velocity is proportional to the operational voltage of the helix. Since the operating characteristics of the traveling wave tube are, thus, dependent upon the helix geometry, it becomes necessary where large scale production is involved, in which variations in helix pitch inevitably appear, to devise a testing system which is effective to recognize those helix values. There is particular need for a test system which is easily and quickly operated for measuring directly the axial wave length of helices.

Such a test apparatus could be extended to other uses. For example, it may be desirable in certain types of traveling wave tubes (such as the backward traveling wave tube or special traveling wave structures designed to eliminate the deleterious effects of bunching of the electrons in the beam) to have a helix structure in which the pitch is not constant. A test device precise in evaluating standing wave voltages would have a special use in determining the varying axial wave length characteristics of such traveling wave tubes. Furthermore, it will be realized that a test apparatus of this type could be easily adapted to accurately determine both the phase and amplitude of the standing wave voltages measured along the helix structure, and, therefore, the impedance characteristics of the helix.

With these problems in mind, it is an object of the invention to provide a device for efficiently measuring the axial wave length of traveling wave tube helices. It is a further related object to determine the characteristics of standing wave voltages on helices. A further object is to provide a method and apparatus for determining the optimum voltage at which a helix will operate when assembled in a finished traveling wave tube. It is also an object to provide a means of determining the axial wave length of helices which permits a rapid yet effective rate of test.

To achieve these objects the invention provides a method and apparatus for measuring the wave length of helical transmission lines at a given frequency in which a signal is applied to one end of a helix under test. The signal is then caused to be reflected by passing a field disturbing member axially along the helix adjacent the external surface of the helix. Values for the reflected wave are recorded with the related location of the field disturbing member. The average axial wave length of the helix may then be calculated by dividing the total distance traveled by the number of reflected signal maxima, or minima, or one half less one the total number of nodes. Another embodiment applies the values of the reflected wave and their related location to a graph, so that variable spacing of the helix turns can be associated with transmission characteristics of the helix.

One embodiment of the invention provides a magnetically permeable probe which is carried adjacent the external surface of the helix and parallel to the helix axis by a lead screw; the lead screw also carries a rotating member which provides an output pulse for a given unit of rotation and, therefore, also for a given linear increment of travel of the probe along the helix.

A specific embodiment of the invention utilizes a counter circuit to count a predetermined number of maxima or minima and also to count the increments of linear distance in which the probe moves between the starting and finishing points.

The invention will be better understood by referring to the following description and the accompanying drawings in which:

FIG. 1 is a diagram partly in schematic and partly in block form of one embodiment of the present invention, and FIG. 2 is a plan view of the probe fixture for positioning the helix under test and providing the reflected signal and the marking pulse, and FIG. 3 is a side elevation of the probe fixture of FIG. 2, and FIG. 4 is a cross-sectional view of the device of FIG. 2, the section being taken on the plane of line 4—4 of FIG. 2, and FIG. 5 is a graph of a typical reflected standing wave voltage obtainable from one embodiment of the invention.

FIG. 1 shows generally one embodiment of the present invention for cold testing the helix structure of traveling wave tubes. The apparatus consists of a probe fixture shown generally at 10 which will be described in more detail in connection with FIGS. 2 through 4, and associated circuitry indicated generally by 20 which amplifies, shapes, and counts the signals originating at the probe fixture 10. The probe fixture 10 provides several features which make the invention particularly adaptable to testing on a production basis where rapidity and accuracy of the tests are essential. A jig, referred to schematically as 11, serves to position the helix 12 in relation to a radio frequency input from signal source 13. Conveniently, a wave guide (not shown) fed by radio frequency signal source 13 is connected to the positioning jig and the best impedance match is established between the wave guide and the helix 12. A magnetically permeable probe 14 carried by a traveling nut 15 is positioned adjacent the helix 12. Traveling nut 15 and the probe 14 are moved relative to the helix by rotation of the lead screw 16 by motor 17.

A magnet 18 is supported on disc 19 which is axially mounted on lead screw 16 so that one revolution of the lead screw causes one revolution of the magnet. A magnetic pickup 21 is located adjacent the periphery of disc 19 in such a position that the passage of magnet 18 in the vicinity of pickup 21 will induce a pulse in line 22.

When RF signals from signal source 13 are fed to helix 12, probe 14 causes perturbations of the radio frequency signal magnetic field and a small reflection of the signal. These reflections are picked up by crystal 23. It is seen, then, that the probe fixture 10 provides two output signals: first, the signal from the magnetic pickup 21 which gives a pulse for each rotation of the lead screw 16; second, the reflected radio frequency signal from the probe which goes through a maximum for each half wave length. If lead screw 16 is threaded with a pitch that provides 0.01 inch travel of the probe for each rotation, and the number of 0.01 inch pulses from the pickup 21 are counted during the time the probe 14 travels from one maximum signal reflection to the next, the result is the axial length along the helix for a half wave length in hundredths of an inch. The usefulness of this determination derives from the correlation which exists between the axial wave length along the helix and the helix voltage required for optimum operation of the traveling wave tube in which the helix is used as follows.

$D$ = Average motion of the probe 14 between adjacent nulls in the reflected wave pattern, in inches
$\lambda$ = Wave length along the helix in meters
$v$ = Velocity of propagation of RF wave along the helix in meters/sec.
$F$ = Frequency of signal
$V$ = Voltage required for accelerating an electron to velocity $v$
$e/m$ = Charge to mass ratio for an electron or $.1762 \times 10^{12}$ The velocity of the electron wave along the axis is given by the formula $$v = \lambda F$$

and the voltage of an electron having a given velocity is determined from the relationship $$v \sqrt{2\frac{e}{m}V}$$

combining and solving for V giving the relation $$V = \frac{\lambda^2 F^2}{2\frac{e}{m}}$$

It is the purpose of the circuitry shown generally in FIG. 1 as 20 to utilize the two output signals from the probe fixture 10 so that the ultimate determination of the axial wave length of the helix involves a minimum of human data-taking or calculation. It will be understood that the specific electronic arrangement described in connection with FIG. 1 is only one of several arrangements which will occur to those versed in the art for accomplishing this purpose. In this particular manifestation of the invention the circuitry counts the number of output pulses from the magnetic pickup during the time the probe travels from one maximum signal reflection to the next. Furthermore, to reduce the error of measurement, the counting is done over a large number of half wave lengths. For example, in a helix designed to operate in the 6,000 megacycles signal range, it has been found convenient to cause the probe to travel about 30 half lengths along the helix being tested.

A detailed circuit description of the several electronic units represented by boxes in FIG. 1 is unnecessary and will not be undertaken. Individually, these are standard units, the internal electrical configurations of which are well known. It is in relation to their combination in connection with the unique purpose of the invention that their novel character and utility lies. This will best be understood in connection with an account of the functions performed by the several units to alter the input signals and of the eventual utilization of these signals.

Start control element 25 contains the starting mechanism for the test set. Depression of a button associated with control unit 25 starts operation of the mechanical probe fixture 10 of the test set by actuating motor control 24 to start motor 17. This causes rotation of lead screw 16, disc 19, and associated magnet 18, and movement of traveling nut 15 along the lead screw with an accompanying movement of probe 14 external to helix 12. Actuation of the start button in control 25 also sends a positive pulse to the pulse amplifier 26 which in turn produces large positive and negative reset pulses at its output. The positive reset pulse is fed to generator 27 which generates a large negative pulse required to reset both the decade counter 28 and preset counter 29. The negative pulse from amplifier 26 resets flip-flop circuits 39 and 30 to their starting condition, it being presumed that prior to reset they are in their final condition of the preceding test. This same negative pulse from amplifier 26 is also fed to a one shot multivibrator 31. Multivibrator 31 generates a pulse which closes pulse gate 32 until the probe fixture 10 reaches full speed. The above enumerated functions prepare the counting circuit for a new helix test automatically.

The radio frequency signal reflected from traveling probe 14 is picked up by crystal 23 and fed to an amplifier-shaper 33. Amplifier-shaper 33 changes the wave form of the reflected RF signal by an appropriate squaring-amplifying action to a form which will operate pulse gate 32 when fixture 10 has come to full speed. The properly shaped reflected signal is fed through pulse gate 32 to preset counter 29. The properly shaped signal is also fed through pulse gate 32 to flip-flop 30 which allows only the first pulse to reach flip-flop 39. Flip-flop 39 in turn opens the pentagrid gate 34.

Opening of gate 34 permits the pulse from magnetic pickup 21 which has been appropriately modified in amplifier-shaper 35 to be fed to decade counter 28. Counting of the pulses from pickup 21 continues in decade counter 28 until preset counter 29 has counted a predetermined number of reflected signals at which time the coincidence gate 36 sends a pulse to flip-flop 39 which, in turn, closes the gate 34 and stops the decade counter 28.

The pitch of lead screw 16 is selected so that each revolution of the lead screw 16 and disc 19 causes a travel of probe 14 of one hundredth of an inch. The number counted on decade counter 28 therefore is the total distance of travel of the probe 14, in hundredths of an inch. This arrangement is, of course, purely arbitrary and numerous combinations of pitches and plural number of magnets is possible to provide pulses in pickup 21 for any desired increment of probe travel. Dividing the total distance traveled by the number of half wave lengths traveled as indicated on the decade counter determines the average axial wave length of the helix. This step too can be simplified by counting a number of half wave lengths which is a multiple of 10. For example, if the preset counter is set for 10 half wave lengths, the value then read on the decade counter will indicate also the one half wave length if divided by 10.

FIGS. 2 through 4 show in detail one embodiment of the probe fixture shown generally at 10 of FIG. 1. The same reference numerals are used throughout to indicate the equivalent parts. Referring to the plan view of FIG. 2, the lead screw 16 is shown supported between bearing members 40. Lead screw drive motor 17 operates through gearing mechanism 41 to provide a 600 r.p.m. output to lead screw 16. The output of 41 is connected to the lead screw 16 by means of an electric coupling 42. Electric brake 43 is provided for stopping the lead screw. Disc 19 is adapted to rotate with lead screw 17 but has in the embodiment of FIGS. 2 through 4 a plurality of magnets 18 supported on its periphery. Magnetic pickup 21, FIG. 3, is supported on a screw and lock positioning arrangement 44 to provide an appropriate clearance which for this embodiment is 0.005 inch. The traveling nut arrangement 15 is prevented from rotating around lead screw 17 by supporting guides 45. The extremes of travel for the lock nut 15 are determined by microswitches 46 and 47 which are operated by extension 60 of lock nut 15. If this embodiment were utilized in connection with the circuit 21 of FIG. 1, these microswitches would determine the starting and cut-off points of preset counter 29 (FIG. 1).

The jig 11 has V-shaped beds 48 for supporting a helix (not shown). Attached to the supporting jig 11 is a wave guide matching section 49 for establishing by means of micrometer adjustment 50 the proper matching between the input wave guide section feeding the signal into 49 and the helix to maintain a minimum standing wave voltage ratio.

Extending from the traveling nut 15 is arm 51 which supports the small probe 14, FIG. 3. Arm 51 is rotatably mounted by means of pivot 53 on the traveling nut 15 so that the arm may conveniently be swung up during insertion and removal of helices in the test set. An adjusting arrangement 52 provides for raising and lowering the probe 14 towards or away from the helix under test.

As has been previously indicated, the embodiment of FIG. 1 utilizing the circuitry 20 is not the sole application of the invention. An electro-mechanical arrangement may be provided for continually plotting the reflected voltage of the radio frequency signal against the changing position of the probe. An example of a measurement of this type is shown in FIG. 5 which plots on the ordinate the reflected standing wave voltage and along the abscissa the distance of travel of the probe along the helix under test in mils. FIG. 5 illustrates that the practical functioning values of operation are frequently different than the ideal conditions that might be expected from a theoretical analysis. The test set of the invention is particularly well adapted to determine such practical conditions. It is seen in FIG. 5 that the distance between minima of the standing wave in this particular helix varies from 0.080 inch to 0.090 inch. Furthermore, an increase in amplitude can be noted in the second, third, and fourth waves of this plot. Determinations of this type facilitate the analysis of noise and gain characteristics which are directly related to the variations in spacing along the length of the helix. In addition, insight gained from such data aids in analyzing the influence of the traveling wave tube materials such as support rods and the glass used to bind the helix wire to the support rods, which affect traveling wave tube performance.

It is apparent from the foregoing discussion, therefore, that considerable modification of the features of the present invention is possible while remaining within the scope of the invention and of the appended claims. It is not intended that this scope should be limited to the embodiments described which were chosen purely for illustrative purposes.

What is claimed is:

1. Apparatus for measuring the axial wave length of a wave transmission line comprising:
    a wave interaction circuit,
    means for supplying a high frequency signal to one end of said circuit for propagating wave energy therealong,
    radio-frequency field distorting means positioned adjacent said circuit for producing predetermined wave reflections exhibiting half-wave length maxima and minima values of signal amplitude,
    means for moving said field distorting means along a path parallel to the axis of said circuit during a measuring operation,
    means electrically coupled to said circuit for recording the number of cycles of said reflected waves, said last-mentioned means including a preset counter for counting a predetermined number of said reflected wave cycles, and
    circuit means responsive to the operation of the moving means for recording the distance traveled by the distorting means while simultaneously a predetermined number of cycles is recorded by the cycle recording means, said circuit means including signal producing means providing a pulse for each predetermined increment of travel of said field distorting means, and a counter under the control of said preset counter and responsive to said signal producing means for counting the number of pulses produced by said last-mentioned means during a predetermined number of wave reflections counted by said preset counter.

2. Apparatus in accordance with claim 1 wherein said interaction circuit comprises a helix, wherein said field distorting means comprises a magnetically permeable probe, and wherein the moving means comprises a lead screw positioned adjacent the external surface of said helix along a path parallel to the axis thereof, and a threaded member mounted on said lead screw for supporting the probe.

3. Apparatus in accordance with claim 2 wherein said signal producing means comprises a magnet rotated with said lead screw and a magnetic pickup located adjacent the path of travel of said magnet, said pickup being electrically connected to said counter under the control of said preset counter, said pickup supplying a pulse indicative of each predetermined increment of travel of said probe adjacent said helix.

4. Apparatus in accordance with claim 3 wherein said means for recording the wave reflections further includes radio-frequency pickup means connected to said helix, amplifier and shaper means connected to the output of said pickup means, and a gating system connected to the output of said amplifier and shaper means for resetting both said preset counter and said counter under the control of said preset counter at the beginning of each test, said gating system stopping the function of said last-mentioned counter when a predetermined number of cycles of said wave reflections have been received by said preset counter.

References Cited in the file of this patent

UNITED STATES PATENTS

| | | |
|---|---|---|
| 2,438,932 | Mahren | Apr. 6, 1948 |
| 2,579,464 | Bergemann | Dec. 25, 1951 |
| 2,680,837 | Sensiper | June 8, 1954 |
| 2,762,984 | Berkley | Sept. 11, 1956 |
| 2,810,520 | Paulsen | Oct. 22, 1957 |
| 2,847,648 | Wendolkowski et al. | Apr. 12, 1958 |